United States Patent [19]
College et al.

[11] Patent Number: 5,695,727
[45] Date of Patent: Dec. 9, 1997

[54] PROCESS FOR REMOVING SULFUR DIOXIDE AND NITROGEN OXIDES FROM A HOT GASEOUS STREAM WITH FERROUS CHELATE REGENERATION

[75] Inventors: John W. College; Shiaw C. Tseng, both of Pittsburgh; David McKinney, Cranberry, all of Pa.

[73] Assignee: Dravo Lime Company, Pittsburgh, Pa.

[21] Appl. No.: 610,997

[22] Filed: Mar. 5, 1996

[51] Int. Cl.$^6$ .............................. B01D 53/50; B01D 53/56
[52] U.S. Cl. .............. 423/235; 423/243.01; 423/243.08
[58] Field of Search .............................. 423/235, 243.01, 423/243.08

[56] References Cited

U.S. PATENT DOCUMENTS

| | | | |
|---|---|---|---|
| 3,914,378 | 10/1975 | Selmeczi | 423/242 |
| 3,919,393 | 11/1975 | Selmeczi | 423/242 |
| 3,919,394 | 11/1975 | Selmeczi | 423/242 |
| 4,126,529 | 11/1978 | DeBerry | 204/180 |
| 4,130,628 | 12/1978 | Barnes et al. | 423/235 |
| 4,158,044 | 6/1979 | Takabatake et al. | 423/235 |
| 4,250,152 | 2/1981 | Biedell et al. | 423/242 |
| 4,612,175 | 9/1986 | Harkness et al. | 423/235 |
| 4,615,780 | 10/1986 | Walker | 204/182.4 |
| 4,670,234 | 6/1987 | Holter et al. | 423/235 |
| 4,820,391 | 4/1989 | Walker | 204/182.4 |
| 4,957,716 | 9/1990 | Cichanowicz et al. | 423/235 |
| 4,976,937 | 12/1990 | Lee et al. | 423/242 |
| 5,200,160 | 4/1993 | Benson et al. | 423/242 |

FOREIGN PATENT DOCUMENTS

| | | | |
|---|---|---|---|
| 948378 | 6/1974 | Canada | 423/243.01 |
| 67776 | 6/1975 | Japan | 423/235 |

OTHER PUBLICATIONS

"Chemical Engineers' Handbook" by Perry et al., 5th ed., McGraw-Hill Book Co. U.S.A.; (1973, No Month) pp. 8-32 and 21-57 to 21-62.

"Chemical Regeneration of Fe(II)-EDTA in Wet Scrubbers" by Y. Joseph Lee and Lewis B. Benson; Hand written data on reference indicates 200th ACS Annual Meeting; Division of Fuel Chemistry: vol. 35, No. 4 (1990, No Month) Pre-Print of Papers, pp. 1427-1432.

"High Removal Wet Scrubbing of $SO_2$ and $NO_x$ Using Electrodialysis and Chemical Reduction For Regeneration by Walker, R.J., Garr-Peters, J.M., Perry, M.B"; 8th Annual Coal Preparation, Utilization, and Environmental Control Contractors Conference; 27-30 Jul. 1992, Westin William Penn Hotel, Pittsburgh Pennsylvania; pp. 324-331.

*Primary Examiner*—Gary P. Straub
*Assistant Examiner*—Timothy C. Vanoy
*Attorney, Agent, or Firm*—Armstrong, Westerman, Hattori, McLeland & Naughton

[57] ABSTRACT

A process for removing sulfur dioxide and nitrogen oxides from a hot gaseous stream, in a scrubbing unit, by use of an aqueous medium containing calcium and magnesium scrubbing components to remove sulfur dioxide and a ferrous chelate to remove the nitrogen oxide, a portion of the ferrous chelate being oxidized to ferric chelate during the process. The ferric chelate is regenerated to ferrous chelate by contacting the hot gaseous stream, prior to entry into the scrubbing unit, with a prescrubbing aqueous medium containing magnesium scrubbing components for sulfur dioxide, forming bisulfite ions in the aqueous medium. The heated prescrubbing aqueous medium, containing bisulfite ions and ferric chelate, is separated from the gaseous stream and contacted with an iron source, at the elevated temperature to convert the iron source to ferrous ions which dissolve in the aqueous medium and reduce the ferric chelate therein to ferrous chelate for use in the scrubbing unit to remove nitrogen oxide from the hot gaseous stream.

18 Claims, 1 Drawing Sheet

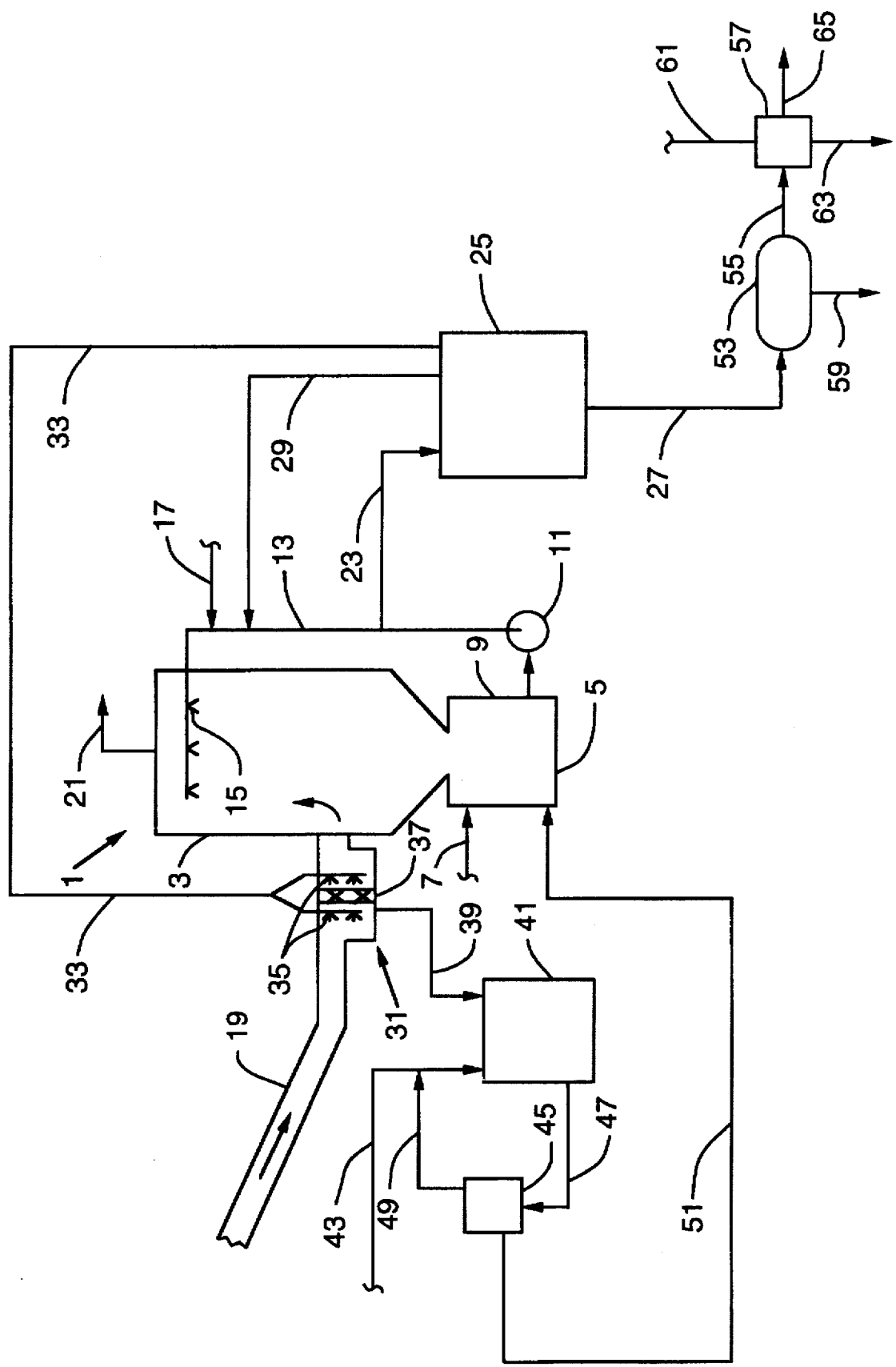

PROCESS FOR REMOVING SULFUR DIOXIDE AND NITROGEN OXIDES FROM A HOT GASEOUS STREAM WITH FERROUS CHELATE REGENERATION

FIELD OF THE INVENTION

The present invention relates to an improved process for removing sulfur dioxide and nitrogen oxides from hot combustion gases where a calcium scrubbing component, such as lime, is used to remove the sulfur dioxide and a ferrous chelate, such as ferrous-EDTA, is used to remove nitrogen oxides from the gas, and where ferric chelates produced by oxidation of ferrous chelates in the process are regenerated to ferrous chelates.

BACKGROUND OF THE INVENTION

The combustion Of carbonaceous fuels, such as coal, to produce heat for generating electrical energy in power plants, produces hot combustion gases which contain sulfur dioxide and nitrogen oxides. Initially, it was sufficient for environmental control purposes to remove only the sulfur dioxide from the hot combustion gases and processes were developed to effect such removal. Especially useful such sulfur dioxide removal processes are described in U.S. Pat. No. 3,919,393, U.S. Pat. No. 3,919,394 and U.S. Pat. No. 3,914,378, assigned to the assignee of the present invention and incorporated by reference herein, which teach the contacting of the hot combustion gases with a magnesium-enhanced aqueous lime scrubbing slurry in a wet scrubbing unit. A further improvement on these magnesium-enhanced lime scrubbing processes for removing sulfur dioxide is described in U.S. Pat. No. 4,976,937, also assigned to the assignee of the present invention and incorporated by reference herein, which involves the addition of a reducing agent such as polysulfides in order to lessen oxidation in the wet scrubber.

With the tightening of environmental standards, processes have been developed which remove nitrogen oxides as well as sulfur dioxide from hot combustion gases. Such processes for simultaneous removal of sulfur dioxide and nitrogen oxides use lime or limestone to react with and remove the sulfur dioxide, while a metal chelate, such as ferrous ethylenediaminetetraacetic acid (ferrous-EDTA), is also added to the scrubbing medium which is effective in removing nitrogen oxides from the hot combustion gas. Such processes for simultaneous removal of sulfur dioxide and nitrogen oxides are described, for example, in U.S. Pat. Nos. 4,612,175 and 4,670,234. A problem that exists in processes where a metal chelate, such as ferrous-EDTA, is used to remove nitrogen oxides from a hot gaseous stream in a wet scrubbing unit is the fact that oxygen present in the scrubbing system oxidizes some ferrous-EDTA to ferric-EDTA. Ferric EDTA is not reactive with nitrogen oxides and must be regenerated, or reduced, to ferrous-EDTA in order to be useful in the process.

Because of the problem of ferrous-EDTA oxidizing to ferric-EDTA, efforts have been made to regenerate the ferric-EDTA by either chemical, electrolytic or combined methods. In U.S. Pat. No. 5,200,160, assigned to the assignee of the present invention, and incorporated by reference herein, a chemical method is described for regenerating ferric-EDTA to ferrous-EDTA where a combination of an initial reducing agent, such as a sulfur-containing compound, with a further reducing agent such as metallic iron or a sulfate salt of sodium, and an antioxidant, such as hydrazine or glyoxal. While such a process is effective, costly materials have been found necessary in the reduction of ferric chelates to ferrous chelates using chemical reduction. With the use of electrolytic reduction, such as described, for example, in U.S. Pat. No. 4,126,599, U.S. Pat. No. 4,615,780 and U.S. Pat. No. 4,820,391, many chemicals that would reduce ferric iron to ferrous iron were disclosed. In many cases, however, the iron must be delivered to the solution as a soluble salt, such as ferrous sulfate heptahydrate. The ferrous sulfate is very soluble and solubilizes as ferrous iron. This adds to the cost of the process and usually introduces undesirable sulfate ions to the system.

It is an object of the present invention to provide a sulfur dioxide and nitrogen oxide removal process where ferric-EDTA in aqueous solution therein is reduced to ferrous-EDTA, by supplying iron to the solution from a metallic iron source, eliminating associate ions.

It is another object of the present invention to provide a sulfur dioxide and nitrogen oxide removal process where available heat and acidity from the hot combustion gases being treated are used for dissolution and reaction of metallic iron to provide ferrous ions for use in the process.

SUMMARY OF THE INVENTION

A process for removing sulfur dioxide and nitrogen oxides from a gaseous stream includes contacting the gaseous stream with an aqueous scrubbing medium containing calcium scrubbing components, such as magnesium-enhanced lime, to remove sulfur dioxide and a ferrous chelate, such as ferrous-EDTA, as a promoter to remove nitrogen oxides, with regeneration effected of ferric chelates formed to ferrous chelates.

The scrubbing of the gases to remove sulfur dioxide and nitrogen oxides is carried out in a wet scrubbing unit having a scrubbing section and a recycle tank, with a portion of the aqueous scrubbing medium removed from the scrubbing unit and passed to a thickener and clarified. Solids are removed from the system while clarified liquor is returned to the scrubbing unit.

Ferric chelates, which are formed by oxidation of ferrous chelates in the present process, are regenerated to ferrous chelates by use of an aqueous magnesium scrubbing component in a prescrubbing step and contact of discharged prescrubbing medium therefrom with an iron source. The hot gaseous stream, prior to introduction into the scrubbing unit, and at an elevated temperature of up to about 150°–175° C., is contacted with a prescrubbing aqueous medium, which is introduced at ambient temperature, containing magnesium scrubbing components for sulfur dioxide, with the prescrubbing aqueous medium heated to an elevated temperature and bisulfite ions produced therein by reaction of the magnesium scrubbing component with sulfur dioxide present in the hot gaseous stream. The prescrubbing aqueous medium, following contact with the hot gaseous stream, and containing bisulfite ions, is then separated from the hot gaseous stream. At an elevated temperature, of about 80° C., the separated prescrubbing aqueous medium, at a pH of 5.5 or below, is contacted with an iron source, such as metallic iron or an iron sulfide, such as FeS or $FeS_2$, which converts the iron source to ferrous ions which dissolve in the separated prescrubbing aqueous medium and form an aqueous solution containing ferrous ions which react with ferric chelates present and reduce the same to ferrous chelates. This aqueous solution containing ferrous chelates is then passed to the recycle tank of the scrubbing unit. Preferably, any solids that are carried by the aqueous solution containing ferrous chelates are removed therefrom prior to passage to the recycle tank of the scrubbing unit.

BRIEF DESCRIPTION OF THE DRAWING

The invention will become more readily apparent from the following description of a preferred embodiment thereof shown, by way of example only, in the accompanying drawing which is a flow diagram illustrating an embodiment of the process of the present invention.

DETAILED DESCRIPTION

The present process removes sulfur dioxide and nitrogen oxides from a hot gaseous stream using a magnesium-enhanced lime scrubbing aqueous medium and reduces ferric-EDTA that is formed back to ferrous-EDTA.

The sulfur dioxide is removed from a hot gaseous stream by contacting the hot gaseous stream in a scrubbing unit containing a scrubbing section and a recycle tank with an aqueous scrubbing medium which contains calcium and magnesium scrubbing components to remove the sulfur dioxide by reaction therewith. Such calcium scrubbing components may comprise lime or limestone while the magnesium scrubbing components may comprise magnesium oxide or magnesium hydroxide. Preferably, the aqueous scrubbing medium is a magnesium-enhanced lime, i.e. a lime which contains a minor amount of magnesium oxide or hydroxide, such that an effective magnesium ion content in a scrubbing section of a wet scrubbing unit of between about 2,000–12,000 parts per million will be provided. The aqueous magnesium-enhanced lime scrubbing slurry may also contain a sulfur-containing reductant such as sulfur or polysulfide such as described in U.S. Pat. No. 4,976,937, with the sulfur-containing reductant preferably added to the magnesium-enhanced lime slurry prior to introduction thereof into the recycle tank of the scrubbing unit.

In addition to the calcium and magnesium scrubbing components, the aqueous scrubbing medium contains a ferrous chelate, such as ferrous-EDTA, which acts as a promoter to remove nitrogen oxides from the hot gaseous stream. However, as previously described, the ferrous chelate will be at least partially oxidized in the system to ferric chelates, and must be regenerated or reduced back to ferrous chelate in order to be effective in the removal of nitrogen oxides.

A portion of the aqueous scrubbing medium, after contact with the hot gaseous stream, is removed from the scrubbing unit and passed to a thickener and clarified. The clarified liquor, or thickener overflow, which will contain dissolved magnesium salts, such as magnesium bisulfite or magnesium sulfite, and some ferric-EDTA and ferrous-EDTA, is returned to the scrubbing unit, while the thickened aqueous slurry, or thickener underflow will be removed from the scrubbing system and contains predominantly calcium solids such as calcium sulfite. The system and scrubbing process as above-described is a known system and process for removal of sulfur dioxide and nitrogen oxides from a hot gaseous stream but suffers from the ferric chelate production and various methods have been proposed to regenerate the ferric chelate back to ferrous chelate, all of which, to date, suffer from expense, complexity or other problems.

In accordance with the present process, ferric chelates, produced in a magnesium-enhanced lime and ferrous chelate-containing scrubbing process for removal of sulfur dioxide and nitrogen oxides, are reduced to ferrous chelates by contact with an aqueous scrubbing medium containing magnesium scrubbing components for sulfur dioxide. In the present process, the hot gaseous stream containing sulfur dioxide and nitrogen oxides is contacted with a prescrubbing aqueous medium containing magnesium scrubbing components for sulfur dioxide, prior to entry of the hot gaseous stream into a scrubbing unit. The magnesium scrubbing components in the prescrubbing aqueous medium may comprise magnesium oxide, magnesium hydroxide, magnesium sulfite, magnesium bisulfite, or mixtures thereof. The hot gaseous stream is generally at a temperature of up to about 150°–175° C. (about 300°–350° F.), and by contact therewith, the prescrubbing aqueous medium, provided at ambient temperature, is heated to an elevated temperature of between about 80°–99° C. and bisulfite ions are produced, in the prescrubbing aqueous medium, generally according to the reactions:

(1) $Mg(OH)_2 + SO_2 = MgSO_3 + H_2O$, and

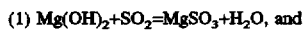

(2) $MgSO_3 + SO_2 + H_2O \rightarrow Mg(HSO_3)_2$.

The prescrubbing aqueous medium, containing bisulfite ions and ferric chelate is separated from the hot combustion gas, prior to entry of the gas into the scrubbing unit, at the elevated temperature, generally a temperature of 80°–99° C. and at an acidic pH of less than about 5.5, preferably of 5.0 or below, and is then contacted with an iron source to regenerate the ferric chelate to ferrous chelate. The iron source is an economical iron source such as metallic iron, a sponge iron or scrap iron, or an iron sulfide, such as FeS, or iron pyrite, $FeS_2$. Such contact of the acidic, bisulfite-containing prescrubbing aqueous medium converts the iron source to ferrous ions which dissolve in the separated prescrubbing aqueous medium and react with ferric chelates present therein to form an aqueous solution of ferrous chelates. The metallic iron present not only forms ferrous iron, but by dissolving it also reduces $Fe^{+++}$. A mole of metallic iron dissolves and reacts with two moles of ferric iron. The result is three moles of ferrous iron:

Fe (metal) + 2 $Fe^{+++} \rightarrow$ 3 $Fe^{++}$.

The metallic iron thereby supplies one mole of $Fe^{++}$ to solution and reduces two moles of $Fe^{+++}$ already in solution to $Fe^{++}$. The aqueous solution containing the ferrous chelates is passed to the recycle tank of the scrubbing unit used for removal of sulfur dioxide and nitrogen oxides from the hot gaseous stream and reused to remove further nitrogen oxides from the hot gaseous stream. Preferably, any solids that are present in the aqueous solution containing ferrous chelates are removed therefrom by a solids separator, such as a magnetic separator or hydroclone prior to entry into the recycle tank of the scrubbing unit.

Referring now to the drawing, a schematic illustration of the present process is shown. A scrubbing unit 1, having a scrubbing section 3 and recycle tank 5 is provided, with an aqueous magnesium-enhanced lime scrubbing medium charged through line 7 to the recycle tank 5 and aqueous scrubbing medium recycled from the recycle tank 5 through line 9 to recycle pump 11 and then through recycle line 13 to aqueous scrubbing medium sprayers 15, with the aqueous scrubbing medium passing downwardly through the scrubbing section 3 of the scrubbing unit 1. A ferrous chelate, such as ferrous-EDTA is also charged to the scrubbing unit, such as through line 17 to recycle line 13. The hot gaseous stream is charged to the scrubbing section 3 of the scrubbing unit 1 through line 19 and passes upwardly therethrough while contacting the downwardly flowing aqueous scrubbing medium with sulfur dioxide and nitrogen oxides removed from the gaseous stream and clean gas discharged through line 21. In the scrubbing unit 1, the sulfur dioxide is removed by conversion to calcium sulfite and magnesium sulfite, while the ferrous chelate removes nitrogen oxides, and due to the presence of oxygen in the scrubbing unit, some ferrous chelates are oxidized to ferric chelates. A portion of the aqueous scrubbing medium is removed through line 23 and passed to a separator, such as thickener 25, with thickener underflow discharged from the thickener 25 through line 27. Clarified liquor, containing dissolved magnesium salts, ferric chelates and some ferrous chelates are removed from the thickener 25 as thickener overflow through line 29 and returned to the scrubbing unit, such as through recycle line 13.

In the present process, a prescrubbing section 31 is provided in line 19, which is charging the hot gaseous stream, at an elevated temperature of up to about 150°–175° C., to scrubbing unit 1. A prescrubbing aqueous medium containing magnesium scrubbing components for sulfur dioxide and ferric chelates is fed to the prescrubbing section 31, from line 33, as a portion of the overflow or clarified liquor from thickener 25, through injectors 35 with preferably a flow deflector 37 provided between a plurality of injectors 35 and the hot gaseous stream is contacted with the prescrubbing aqueous medium prior to entry into the scrubbing unit 1. The prescrubbing aqueous medium, or clarified liquor, contains dissolved magnesium salts, ferric chelates and some ferrous chelates. By such contact, the prescrubbing aqueous medium is heated to between about 80°–99° C. and bisulfite ions produced therein by reaction of the magnesium scrubbing components with the sulfur dioxide in the hot gaseous stream. The contacted prescrubbing aqueous medium at an acid pH, is removed from the hot gaseous stream through line 39 from the prescrubbing section 31 and not permitted to enter the scrubbing unit 1. The separated prescrubbing aqueous medium, which contains bisulfite ions and ferric chelates, at the above-described elevated temperature is passed to a reaction vessel 41 to which there is also charged an iron source, such as metallic iron, FeS or FeS$_2$ through line 43. In the reaction vessel 41, the separated prescrubbing aqueous medium is contacted with the iron source, for a period of time, preferably up to about one hour contact, and the iron source is converted to ferrous ions which dissolve to form an aqueous solution thereof and convert ferric chelates in the prescrubbing aqueous medium to ferrous chelates. The resultant aqueous solution of ferrous chelates is passed to a separator 45 through line 47 where solids are removed and returned to the reaction tank 41 through line 49. The clear aqueous solution containing ferrous chelates is then passed through line 51 to the recycle tank 5.

In order to recover further ferrous chelate in the system, the thickener underflow from thickener 25, discharged through line 27 may enter a secondary dewatering system, such as a belt filter 53 and the filter cake produced passed through line 55 to a filter cake washing device 57, while filtrate is removed through line 59. Fresh water is fed to the filter cake washing device 57 through line 61 so as to dissolve and further recover chelates which are removed, as a solution, through line 63 while the washed filter cake is discharged through line 65 for disposal. The recovered chelates in filtrate from line 59 and in wash water from line 63 may be returned to the scrubber unit 1 for reuse.

EXAMPLE

A 5 kW test facility was provided which had a vertical scrubber, recycle tank, thickener, digester reaction tank (RT), iron thickener or settler, heat exchanger, synthetic flue gas generating station, gas sampling sub-system, oxygen, SO$_2$ and NO$_x$ analyzers, and related Peristaltic pumps and controllers. The scrubber was equipped with five trays. The top and bottom trays were made of 12.2% opening clear plastic. The middle three trays were made of steel screen wire, two layers per tray location, which were sealed to the inside of the scrubber to maximize gas-liquid contact by preventing the liquor from running down the inside of the scrubber. About ⅓ of the space above the bottom tray was filled with ½" Bell saddle packing, and ~80–90% of the space above the wire screens was filled with ⅜" Bell saddle packing.

Iron powder was held in a separate container and was added manually to the reaction tank every 15 minutes for each phase. The iron was added in five (5) gram quantities for phases one and two and in ten (10) gram quantities for phase three.

The 5 kW scale test unit was to be operated under the following conditions for each test:

Use of the 5.5φ"×24" countercurrent absorber utilizing two clear plastic trays with 12.2% open area (Trays 1 and 5) and three wire screen supports with ³⁄₁₆" openings between the plastic trays;

½" Bell saddle packing filling ~⅓ of the space above Tray No. 5 and ⅜" Bell saddle packing filling ~80–90% of the space above the screen supports (Tray Nos. 2, 3, and 4);

A flue gas velocity (FGV) of 0.808 feet per second based on a gas flow rate of 8.0 ft$^3$/min (SCFM);

A liquid to gas ratio (L/G) ranging from ~66 to ~90 based on liquid flow rates of ~2.0 L/min to ~2.7 L/min, respectively;

Inlet flue gas SO$_2$, NO$_x$, and O$_2$ concentrations of ~2500 ppm, 600 ppm, and ~10.0 vol %, respectively;

The range of chemistry for the aqueous scrubbing solution during testing was:
SO$_3$: 3000 to 10,000 ppm (7000 ppm average)
Mg$^{++}$: 8000 to 10,000 ppm (9000 ppm average)
Ca$^{++}$: 3000 to 5,000 ppm (4000 ppm average)
S$_2$O$_3$: 200 to 800 ppm (500 ppm average)
Cl$^-$: 4000 to 5000 ppm (4500 ppm average)
Na$^+$: 1000 to 2000 ppm (1500 ppm average)

Scrubber blowdown rate (to thickener) of ~120 ml/min and maintained recycle tank and thickener volumes of ~9 L and ~9.2 L, respectively;

The pH in the recycle tank was set at ~5.5 from start-up until 20:00 on Day 2, then raised to ~5.9 for the remainder of the run. The pH in the reaction tank way targeted at 4–4.5 by using dilute sulfuric acid;

Temperatures in the recycle tank and reaction tank targeted at ~120° F. and ~180° F., respectively;

From ~8:30 to 15:00, Day 1, 5 grams of iron powder was added to the reaction tank every 15 minutes and 25 grams Na$_4$EDTA was added to the reaction tank every 30 minutes;

From 15:00, Day 1 to ~7:00, Day 3, 5 grams of iron powder was added to the reaction tank every 15 minutes and 20 grams of EDTA acid was added to the reaction tank every 30 minutes;

From ~8:00 to 16:00, Day 3, 10 grams of iron powder was added to the reaction tank every 15 minutes, but no EDTA added during this period.

The results of the tests are summarized in Table I.

TABLE I

| | Clock Time (Hr:Min) | Recycle Tank Liquor pH | Alkalinity (ppm) | [Fe$^{+2}$] RT (mM) | [Fe$_{tot}$] RT (ppm) | Filter cake Solids (wt %) | NO Removal (%) | SO$_2$ Removal (%) |
|---|---|---|---|---|---|---|---|---|
| Day 1 | 9:00  | 5.1  | 984   | 61   | 6,070  |       | 49.17 | 96.13 |
|       | 11:00 | 5.1  | 2,045 | 45.1 | 6,810  | 70.47 | 46.96 | 97.43 |
|       | 13:00 | 5.2  | 2,685 | 42.8 | 7,966  | 71    | 48.82 | 98.20 |
|       | 15:00 | 5.15 | 2,085 | 54.9 | 8,866  | 67.13 | 52.56 | 98.23 |
|       | 17:00 | 5.05 | 2,218 | 55.3 | 9,557  | 58.32 | 46.60 | 97.71 |
|       | 19:00 | 6.5  | 4,770 | 35.4 | 9,319  |       | 52.10 | 99.41 |
|       | 21:00 | 5.1  | 2,285 | 70.4 | 12,300 | 52.53 | 46.25 | 97.28 |
|       | 23:00 | 5.2  | 4,370 | 73.9 | 12,670 | 53.09 | 47.46 | 97.36 |
| Day 2 | 1:00  | 5.05 | 2,969 | 53.1 | 11,210 | 54.59 | 47.14 | 98.11 |
|       | 3:00  | 5    | 2,662 | 61.4 | 12,130 | 55.78 | 47.65 | 97.99 |
|       | 5:00  | 5.6  | 5,171 | 69   | 11,790 | 54.95 | 49.03 | 99.13 |
|       | 7:00  | 6    | 7,656 | 69.9 | 11,980 | 57.96 | 50.00 | 99.45 |
|       | 9:00  | 4.85 | 3,069 | 65.2 | 10,920 | 51.05 | 48.70 | 98.20 |
|       | 11:00 | 4.9  | 3,570 | 57.5 | 11,260 | 61.71 | 50.57 | 98.50 |
|       | 13:00 | 4.85 | 3,169 | 67.6 | 12,380 | 60.44 | 50.08 | 98.56 |
|       | 15:00 | 4.6  | 1,418 | 68.2 | 13,630 | 64.1  | 46.28 | 97.04 |
|       | 17:00 | 5.05 | 3,603 | 61.9 | 11,920 | 62.41 | 48.21 | 98.85 |
|       | 19:00 | 5.1  | 3,536 | 49.3 | 12,300 | 60.37 | 44.64 | 98.89 |
|       | 21:00 | 5.6  | 5,254 | 41.4 | 11,770 | 55.19 | 45.00 | 98.86 |
|       | 23:00 | 5.6  | 5,254 | 56.6 | 11,850 | 58.29 | 44.75 | 99.75 |
| Day 3 | 1:00  | 5.6  | 4,220 | 53.1 | 10,720 | 58.07 | 47.70 | 98.82 |
|       | 3:00  | 5.2  | 3,169 | 56.8 | 11,290 | 58.59 | 47.36 | 98.84 |
|       | 5:00  | 6    | 6,672 | 44.6 | 11,170 | 55.87 | 43.09 | 99.59 |
|       | 7:00  | 5.8  | 6,972 | 57.4 | 10,800 |       | 43.27 | 99.59 |
|       | 9:00  | 5.65 | 5,054 | 57.6 | 9,973  | 58.95 | 46.76 | 99.33 |
|       | 11:00 | 5.35 | 4,237 | 69.7 | 9,691  | 59.63 | 53.15 | 99.16 |
|       | 13:00 | 5.3  | 3,570 | 67.6 | 9,510  | 55.8  | 53.43 | 99.42 |
|       | 15:00 | 6.2  | 5,738 | 83.5 | 8,217  | 51.9  | 50.00 | 99.50 |

Operation of the 5 kW with the integration of a reaction tank and using iron powder as the reducing agent proved to be quite successful in terms of SO$_2$ and NO$_x$ removals with only minor difficulties. SO$_2$ removal was very good for the entire ~55 hours of the run with minimum removals ~97% and average removals ~99% throughout the run. Likewise, NO$_x$ removal also proved to be very successful with removals averaging between 45% and 50% for the entirety of the run and even reaching almost 55% removal at times.

SO$_2$ removal is obviously dependent upon the characteristics of the scrubbing liquor such as pH and alkalinity. During the first ~35 hours of the run when the pH was targeted at 5.5, SO$_2$ removal was high but not very consistent and seemed more apt to vary with the alkalinity. However, when the pH was raised to a target of 5.9, SO$_2$ removal was much more consistent and also was higher than observed when the pH was set at 5.5.

Oxygen concentrations were held approximately constant during operation at ~9.0–10.0 vol % and the pH levels were maintained at a level ~5.2–5.5 (targeted at 5.5) for the first ~35 hours of the run, followed by a pH in the range of 5.7–5.9 (targeted at 5.9) for the remainder of the run.

On examination of dewatering success, it was found that the percent solids decreased from ~71% to ~55% averaging ~59%. It is desirable to have a high percent of solids in the waste to avoid extensive use of landfill space and to allow lower waste treatment costs.

In summary, addition of iron powder utilizing a reaction tank as a digester appears to have a very good ability to reduce ferric iron to ferrous iron, resulting in a high level of ferrous iron which was maintained throughout the run. Thus, NO$_x$ removal was very high as well, deeming iron digestion very useful for a sulfur dioxide and nitrogen oxide process.

What is claimed is:

1. In a process for removing sulfur dioxide and nitrogen oxides from a hot gaseous stream containing the same wherein said gaseous stream is contacted, in a scrubbing unit having a scrubbing section and recycle tank, with an aqueous scrubbing medium containing calcium and magnesium scrubbing components to remove sulfur dioxide and a ferrous chelate to remove nitrogen oxides, with a portion of said ferrous chelate oxidized to ferric chelate, where a portion of the aqueous scrubbing medium is removed from the scrubbing unit and passed to a thickener and clarified, and clarified liquor returned to said scrubbing unit, the improvement comprising regenerating said ferric chelate to ferrous chelate by:

contacting said hot gaseous stream, prior to entry into said scrubbing unit, with a prescrubbing aqueous medium consisting essentially of magnesium scrubbing components for sulfur dioxide, selected from the group consisting of magnesium oxide, magnesium hydroxide, magnesium sulfite, and mixtures thereof, and ferric chelates, wherein said prescrubbing aqueous medium is heated to an elevated temperature and bisulfite ions are produced in said prescrubbing aqueous medium;

separating said prescrubbing aqueous medium, at the elevated temperature and following said contact, from the hot gaseous stream;

contacting said separated prescrubbing aqueous medium at the elevated temperature and at a pH of 5.5 or below with an iron source selected from the group comprising metallic iron and an iron sulfide which reacts with said ferric chelates to produce ferrous chelates that dissolve in said separated prescrubbing aqueous medium and form an aqueous solution of ferrous chelates; and passing said contacted aqueous solution containing said ferrous chelates to the recycle tank of said scrubbing unit.

2. The process for removing sulfur dioxide and nitrogen oxides from a hot gaseous stream as defined in claim 1 wherein said ferrous chelate is ferrous-EDTA.

3. The process for removing sulfur dioxide and nitrogen oxides from a hot gaseous stream as defined in claim 1 wherein said hot gaseous stream is at an elevated temperature of about 150°–175° C. when contacted with said prescrubbing aqueous medium, prior to entry into said scrubbing unit.

4. The process for removing sulfur dioxide and nitrogen oxides from a hot gaseous stream as defined in claim 1 wherein said iron source is metallic iron.

5. The process for removing sulfur dioxide and nitrogen oxides from a hot gaseous stream as defined in claim 1 wherein said iron source is FeS.

6. The process for removing sulfur dioxide and nitrogen oxides from a hot gaseous stream as defined in claim 1 wherein said iron source is $FeS_2$.

7. The process for removing sulfur dioxide and nitrogen oxides from a hot gaseous stream as defined in claim 1 wherein said separated aqueous medium is contacted with said iron source at an elevated temperature of up to 99° C.

8. The process for removing sulfur dioxide and nitrogen oxides from a hot gaseous stream as defined in claim 1 wherein said separated prescrubbing aqueous medium is contacted with said iron source for a period of time of up to one hour.

9. The process for removing sulfur dioxide and nitrogen oxides from a hot gaseous stream as defined in claim 1, including removing any solids from said contacted prescrubbing aqueous medium prior to passing said aqueous solution to said recycle tank.

10. The process for removing sulfur dioxide and nitrogen oxides from a hot gaseous stream as defined in claim 9 wherein said removing of solids includes magnetic separation.

11. The process for removing sulfur dioxide and nitrogen oxides from a hot gaseous stream as defined in claim 9 wherein said removing of solids is by passage through a hydroclone.

12. In a process for removing sulfur dioxide and nitrogen oxides from a hot gaseous stream containing the same wherein said gaseous stream is contacted, in a scrubbing unit having a scrubbing section and a recycle tank, with an aqueous scrubbing medium containing magnesium-enhanced lime to remove sulfur dioxide and a ferrous-EDTA to remove nitrogen oxides, with a portion of said ferrous-EDTA oxidized to ferric-EDTA, where a portion of the aqueous scrubbing medium is removed from the scrubbing unit and passed to a thickener and clarified, and clarified liquor returned to said scrubbing unit, the improvement comprising regenerating said ferric-EDTA to ferrous-EDTA by:

contacting said hot gaseous stream, prior to entry into said scrubbing unit, with a prescrubbing aqueous medium consisting essentially of a magnesium scrubbing component for sulfur dioxide selected from the group consisting of magnesium oxide, magnesium hydroxide, magnesium sulfite, and mixtures thereof, and ferric chelates, wherein said prescrubbing aqueous medium is heated to an elevated temperature of up to about 99° C. and bisulfite ions are produced in said prescrubbing aqueous medium;

separating said prescrubbing aqueous medium, at the elevated temperature and following said contact, from the hot gaseous stream;

contacting said separated prescrubbing aqueous medium, at an elevated temperature of up to about 99° C. and at a pH of 5.5 or below, with an iron source selected from the group comprising metallic iron and an iron sulfide which reacts with said ferric chelates to produce ferrous chelates that dissolve in said separated prescrubbing aqueous medium and form an aqueous solution of ferrous chelates;

removing solids from said contacted prescrubbing aqueous medium; and passing said contacted aqueous solution containing said ferrous chelates to the recycle tank of said scrubbing unit.

13. The process for removing sulfur dioxide and nitrogen oxides from a hot gaseous stream as defined in claim 12 wherein said iron source is metallic iron.

14. The process for removing sulfur dioxide and nitrogen oxides from a hot gaseous stream as defined in claim 12 wherein said iron source is FeS.

15. The process for removing sulfur dioxide and nitrogen oxides from a hot gaseous stream as defined in claim 12 wherein said iron source is $FeS_2$.

16. The process for removing sulfur dioxide and nitrogen oxides from a hot gaseous stream as defined in claim 12 wherein said separated prescrubbing aqueous medium is contacted with said iron source for a period of time of up to one hour.

17. The process for removing sulfur dioxide and nitrogen oxides from a hot gaseous stream as defined in claim 12 wherein said removing of solids includes magnetic separation.

18. The process for removing sulfur dioxide and nitrogen oxides from a hot gaseous stream as defined in claim 12 wherein said removing of solids is by passage through a hydroclone.

* * * * *